United States Patent [19]
Kato et al.

[11] Patent Number: 5,459,378
[45] Date of Patent: Oct. 17, 1995

[54] CRT DISPLAY APPARATUS

[75] Inventors: Kazuo Kato, Ibaraki; Takashi Sase, Hitachi; Fumio Tajima, Ibaraki; Tomohiko Douken, Hitachi, all of Japan

[73] Assignee: Hitachi, Ltd., Tokyo, Japan

[21] Appl. No.: 111,074

[22] Filed: Aug. 24, 1993

[30] Foreign Application Priority Data

Aug. 31, 1992 [JP] Japan .................... 4-230861

[51] Int. Cl.⁶ .................... H01J 29/58
[52] U.S. Cl. .................... 315/382.1
[58] Field of Search .................... 315/382, 382.1; 348/357, 180, 345, 347, 350

[56] References Cited

U.S. PATENT DOCUMENTS 3,792,927  2/1974  Bertram .
4,955,680  9/1990  Forese-Peeck et al. ............... 315/382
5,105,128  4/1992  Choi ........................... 315/382

FOREIGN PATENT DOCUMENTS 63-230861  8/1988  Japan .

*Primary Examiner*—Theodore M. Blum
*Attorney, Agent, or Firm*—Kenyon & Kenyon

[57] ABSTRACT

A CRT display apparatus equipped with a control apparatus for performing a focusing control and a brightness control by changing a grid voltage by means of a potentiometer. The control apparatus includes a motor for driving the potentiometer in response to an externally supplied control signal, and the motor is mechanically arranged with the potentiometer in an integrated form. Both of a plurality of potentiometers and motors for driving the plural potentiometers are formed on the same substrate in an integrated form. Also, the control apparatus is molded with a flyback transformer for constituting the CRT display apparatus. The motor is constructed of either an ultrasonic motor, or a plastic geared motor.

12 Claims, 7 Drawing Sheets

CRT DISPLAY APPARATUS

BACKGROUND OF THE INVENTION

The present invention generally relates to a CRT display apparatus. More specifically, the present invention is directed to a CRT (cathode-ray tube) display apparatus having a high-voltage/precise voltage control apparatus for performing a focusing control and a brightness control (screen voltage control).

In the conventional apparatuses for utilizing high-precision electron beams, such as CRT display apparatuses (involving television receivers), a focusing control is necessarily required by which a high voltage of a focusing electrode is controlled, or adjusted to realize a clear beam spot. Concretely speaking, in a computer color CRT display apparatus with employment of a bipotential tube, a high-voltage focusing control voltage is needed, and a variable voltage dividing circuit (constructed by a potentiometer) for dividing an anode voltage into relatively high voltages of 6 to 8 KV is employed to apply such relatively high voltages to two focusing electrodes in order to follow variations in the anode voltage at high speeds. Then, these voltages are controlled so as to minimize the spot diameters, while a parabolic voltage is applied via a capacitor to one of these focusing electrodes. Similarly, another voltage dividing circuit is used so as to follow the screen voltage. A typical conventional voltage controlling circuit has been opened in, for instance, JP-A-63-203063.

That is to say, this prior art publication describes an improvement in the focusing control of the color CRT display apparatus. The voltage dividing resistor circuit is arranged by such a series circuit constructed of the parallel resistor circuit used to derive convergence voltages for the first and second convergence electrodes with the electrode pieces for constituting the 4-pole lense, and also the resistor circuit provided at the low voltage side. To this convergence-voltage deriving parallel resistor circuit, both of the variable resistor for controlling the first convergence voltage and the variable resistor for controlling the second convergence voltage are connected in a parallel form. These two variable resistors are independently adjusted or controlled, so that preselected optimum DC convergence voltages are applied to the first convergence electrode and the second convergence electrode, and furthermore, the parabolic voltages synchronized with the deflection period are applied to the first and second convergence electrodes. As a consequence, optimum convergence conditions of the electron beams can be obtained over not only the peripheral portion of the screen, but also the central portion thereof, and also the variable screen voltage for controlling the cut-off point can be obtained at the same time.

Since this conventional focusing control operation requires very precise beam spot adjustments, resulting in fatigue of operators, it is preferable to automatically perform such a focusing control operation. However, it is practically difficult to realize an automatic focusing control operation, because the above-described focusing control operation must be carried out under high voltage and precise adjustment.

As to the conventional high voltage/precise controlling method, such an automatic control method may be conceived that a motor-driven screw driver having a precise alignment servo mechanism is used to be fitted to the rotary unit of the above-described focus controlling potentiometer.

However, such an automatic focus control method owns the following drawbacks. That is to say, it is rather difficult to maintain reliability over a long time for such a mechanically precise alignment. Moreover, this difficulty is emphasized because the recently developed CRT display apparatuses employ the tilt and swivel mechanism. Accordingly, no automatic control method with high precision and reliability have been developed in view of practical capability.

SUMMARY OF THE INVENTION

The present invention provides a compact control apparatus with high reliability, capable of automatically performing a high voltage and precise voltage control (adjustment) for a focusing control and a brightness control of a CRT display apparatus.

The present invention realizes an automatic focusing control and a screen control with employment of the above-described control apparatus.

The present invention also minimizes magnetic interference.

The present invention a CRT (cathode-ray tube) display apparatus comprising a control apparatus for controlling a CRT display by changing a grid voltage by means of a potentiometer. The control apparatus includes a motor for driving the potentiometer in response to an externally supplied control signal, and the motor is mechanically arranged with the potentiometer in an integrated form. Also, to achieve this object there are provided the following technical ideas. A plurality of potentiometers and the motors for driving these potentiometers are formed on the same board in an integrated form. The control apparatus is molded with a flyback transformer for constituting the CRT display apparatus. Also, the above-described motor is constructed of either an ultrasonic motor, or a plastic geared motor.

The present invention provides an image apparatus positioned at a display screen side of the CRT display apparatus, and the motor is driven in response to an output signal derived from the imaging apparatus to automatically control at least one of focusing and brightness of the CRT display apparatus.

The present invention provides the drive motor adjacent to the flyback transformer, whereby the control apparatus can be operated without any trouble even in a strong magnetic field.

In accordance with the means for achieving the above-described objects of the present invention, since the potentiometer for dividing the high voltage is mechanically combined with the motor for driving this potentiometer in an integrated form, a compact automatic control apparatus can be realized. Also, since a plurality of potentiometers and the motor for driving these potentiometers are formed on the same board in an integrated form, which are then molded with the flyback transformer in an integrated form, the CRT display apparatus can be made compact. Even when such a drive motor as an ultrasonic motor and a plastic geared motor is integrally molded with the flyback transformer, or is operated adjacent to the flyback transformer, this drive motor can be operated even in the strong magnetic field, so that magnetic interference can be minimized and reliability can be improved. Also, since the ultrasonic motor or the plastic geared motor may be driven by intermittently applying a pulse voltage thereto, the potentiometers may be driven in a stepwise mode, so that a fine and precise voltage control is realized.

In accordance with a means for achieving another object of the present invention, the motor formed with the potentiometers in an integrated form is driven based upon the output signal derived from the imaging apparatus arranged at the display screen side of the CRT display apparatus in order that both of the focusing and the brightness of the CRT apparatus becomes optimum, whereby an automatic focusing/brightness controlling operation can be realized.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
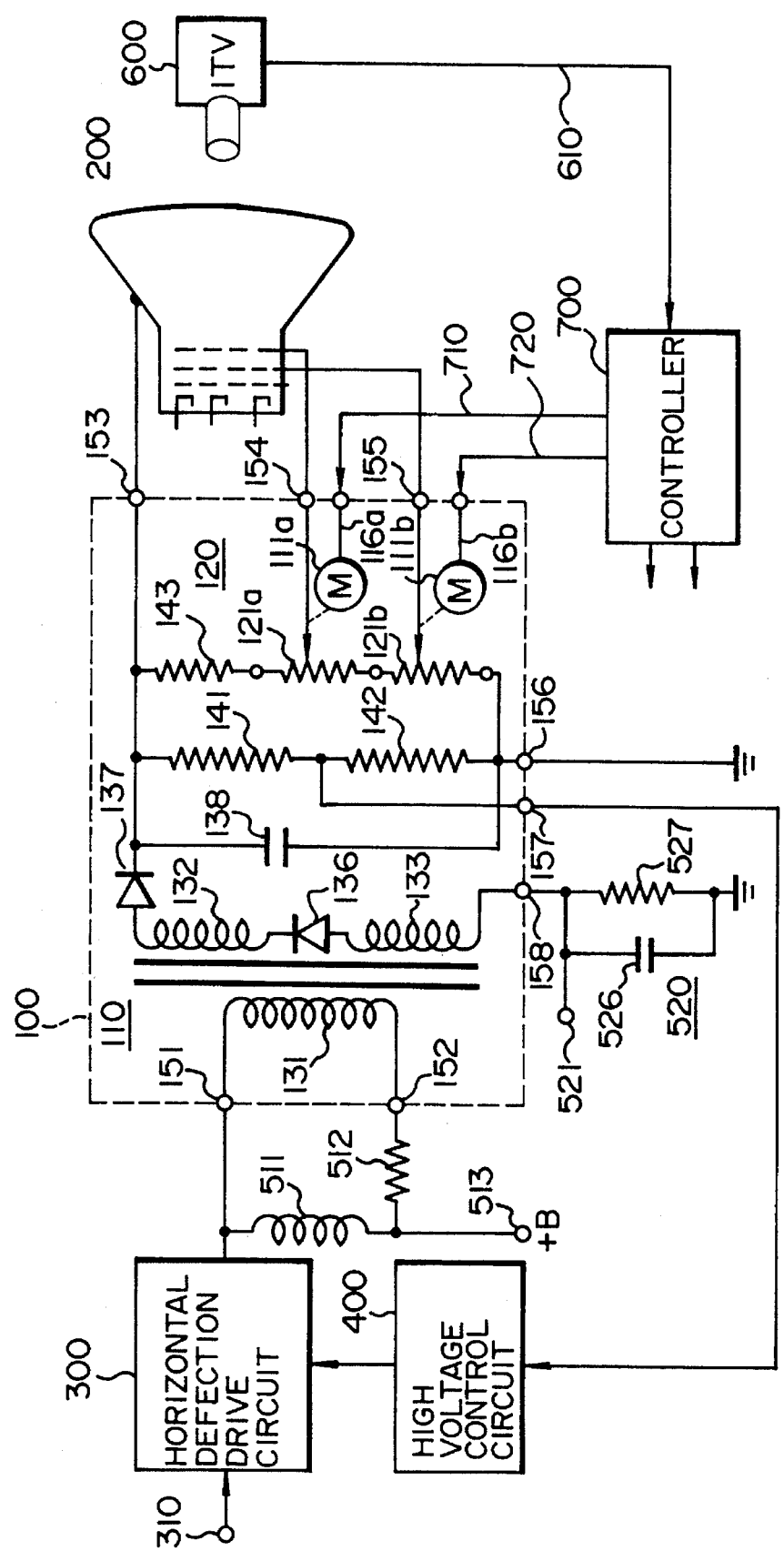
FIG. 1 schematically shows a control arrangement of an automatic focusing control system employed in a CRT display apparatus according to a first preferred embodiment of the present invention.

In FIG. 1, there is shown a focusing voltage control (adjustment) and a screen voltage control (adjustment) of a CRT (cathode-ray tube) display apparatus, to which the present invention has been applied, according to a preferred embodiment of the present invention. In FIG. 1, a high voltage generating circuit 100 is constructed of a flyback transformer 110, an output voltage dividing circuit 120, and other circuit elements, and is resin-molded in an integrated form except for a terminal thereof in order not to expose the high voltage unit. A primary winding 131 of the flyback transformer 110 is connected via a resistor 512 in parallel to a horizontal deflection coil 511, and is driven (energized) by a +B power supply applied to a terminal 513 and a horizontal deflection drive circuit 300. More specifically, the flyback transformer 110 is driven via the primary winding 131 by a pulse voltage generated during the horizontal flyback period of the horizontal synchronization (deflection) pulse voltage. It should be noted that the horizontal synchronization pulse is input to a terminal 310.

On the other hand, an output of secondary windings 132 and 133 of the flyback transformer 110 are applied as an anode voltage of a CRT display apparatus 200 in such a manner that this output voltage is rectified by rectifier diodes 136 and 137, and then smoothened by a capacitor 138, and thereafter applied via a high voltage output terminal 153. A typical voltage range of this anode voltage is 25 KV to 30 KV. Another terminal of the secondary winding 133 of the flyback transformer 110 is grounded through an over current detecting circuit 520 arranged by a parallel circuit of a capacitor 526 and a resistor 527.

It is so arranged that the anode output voltage of the flyback transformer 110 is detected via a voltage dividing circuit constructed of resistors having high resistance values 141 and 142, and the pulse voltage of the horizontal deflection drive circuit is controlled via a high voltage control circuit 400 in order that the anode voltage becomes a preselected constant voltage.

The high voltage to be applied to an anode output terminal 153 is divided by an automatic controlling apparatus 120 arranged by a resistor having a high resistance value 143, potentiometers with high resistance values 121a and 121b, and drive motors 111a and 111b. A divided voltage is applied from a terminal 154 to a focusing electrode of the CRT display apparatus 200 (normally, although a high-precision CRT display apparatus, or a large-screen television owns two focusing electrodes, only one focusing electrode is shown for purposes of simple illustration in the preferred embodiment of FIG. 1). Similarly, the divided voltage is applied from a terminal 155 to a screen electrode of the CRT display apparatus 200. Normally, voltage ranges of these required divided voltages are 6 to 8 KV for the focusing electrode and 500 to 800 V for the screen electrode.

A resistance value of the potentiometer 121a for controlling the focusing voltage is selected to be several to 10M (ohms). Both of the potentiometer 121a and a drive motor 111a are mechanically formed in an integral mode, and either a compact plastic geared motor, or an ultrasonic motor is employed as this drive motor. This compact motor owns such a feature that relatively no magnetic influence is given and this motor is suitable to be molded in an integrated form with the flyback transformer 110.

An industrial imaging apparatus (ITV) 600 equipped with an optical enlarging lens system and a light receiving sensor is arranged at a screen side of the CRT display apparatus 200, the output 610 of which is connected to a controller 700 including a microcomputer. Drive outputs of the controller 700 are connected to an input line 116'a of the drive motor 111a for controlling the focusing voltage and to an input line 116b of the drive motor 111b for controlling the screen voltage, respectively.

In the above-described circuit arrangement shown in FIG. 1, upon receipt of the synchronization at the synchronization input terminal 310, the horizontal deflection drive circuit 300 drives the deflection coil 511 and the primary winding coil 131 of the flyback transformer 110 to generate a voltage having a value on the order of 30 KV at the anode output terminal 153 of the secondary winding of the flyback transformer 110. This anode voltage is detected by the voltage dividing circuit constructed of the registers having the high resistance values 141 and 142, and the divided anode voltage is negative-feedback-controlled by the high voltage control circuit 400 so as to obtain a constant voltage, so that this anode high voltage becomes constant, and the CRT display apparatus 200 is under display condition.

Figure 2:
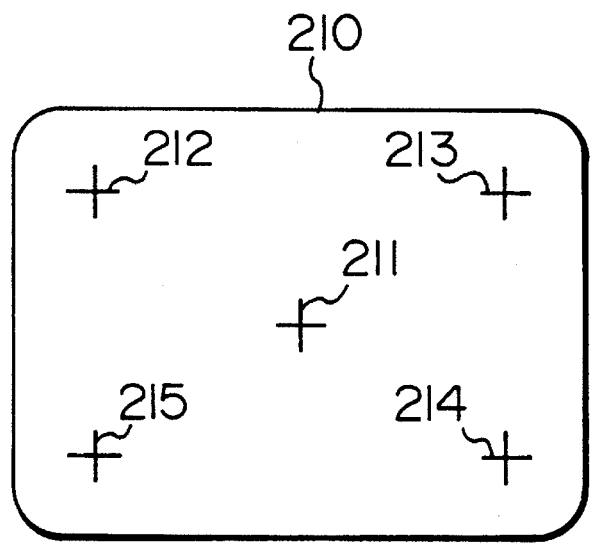
FIG. 2 illustrates an example of a crosshatch pattern utilized in the automatic focusing control of the arrangement shown in FIG. 1.
Figure 3:
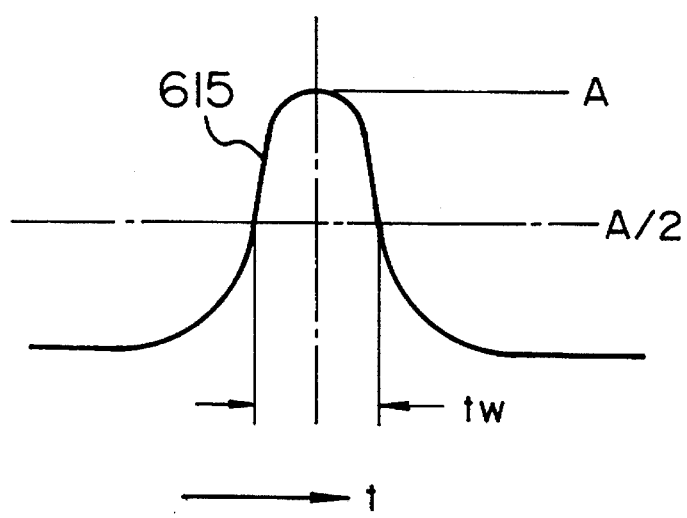
FIG. 3 is a waveform of an electric output signal corresponding to a line width of the crosshatch pattern employed in the automatic focusing control of the arrangement indicated in FIG. 1.

Under such a condition, the automatic focusing control (adjustment) of the arrangement shown in FIG. 1 is performed as follows:

It should be noted that FIG. 2 shows an example of a crosshatch pattern employed in the automatic focusing control of the arrangement shown in FIG. 1, and FIG. 3 shows a waveform of an electric output signal corresponding to a line width of the crosshatch pattern used in the automatic focusing control of the arrangement shown in FIG. 1.

First, crosshatch patterns (cross-shaped patterns) 211 to 214 as represented in FIG. 2 are projected onto positions on the screen of the CRT display apparatus, where the focusing should be controlled. These crosshatch patterns are focused by the imaging apparatus 600 to convert the line components of the crosshatch patterns into electrical signals as shown in FIG. 3. That is to say, the waveform of FIG. 3 corresponds to the electric signal output obtained when the line component of the crosshatch patterns are scanned by the imaging apparatus (ITV) 600. In this case, the line width is defined by a scanning time duration "$t_w$" at an amplitude of A/2. In other words, a value "W" obtained by counting this time duration "$t_w$" by a counter with a constant clock is used as focusing information, and the focusing voltage is controlled in order that this value "W" becomes minimum. Such a condition is regarded as a best focusing condition.

A control and a judgement for this focusing control operation are executed by the controller 700 equipped with the microcomputer shown in FIG. 1. That is, in FIG. 1, from the output 710 of the controller 700, a stepwise drive voltage is applied to the drive motor 111a of the automatic controlling apparatus 120, whereby the dividing voltage of the focusing potentiometer 121a is fine-controlled in such a manner that the signal "$t_w$" of the above-described line width becomes minimum.

Figure 4:
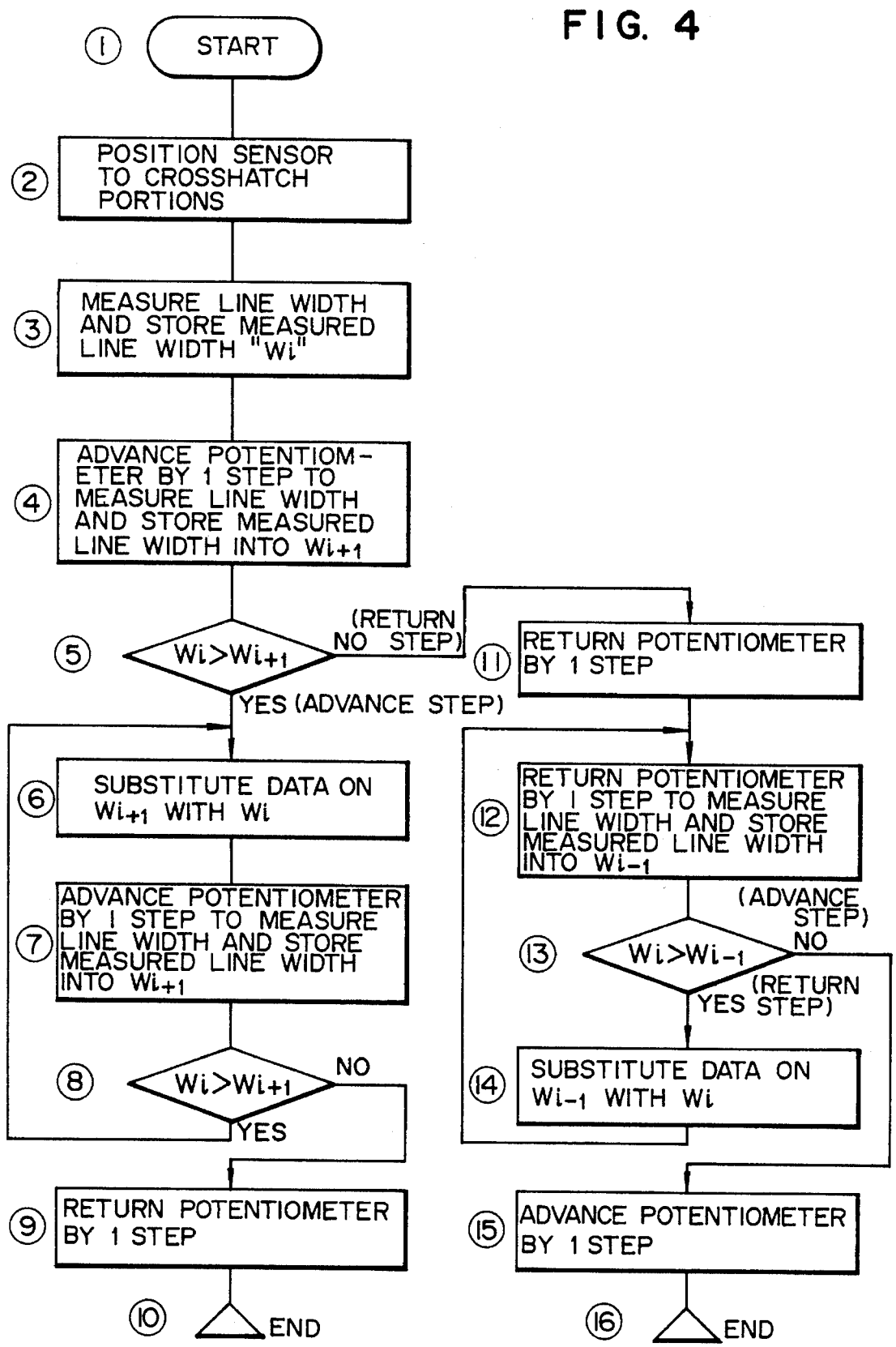
FIG. 4 is a flow chart for indicating an example of the automatic focusing control operation according to the present invention.

In FIG. 4, there is shown a flow chart for explaining the above-explained automatic focusing control operation. A major point of this automatic focusing control operation will now be summarized. After the sensor of the imaging apparatus has been focused onto an object for control (at a step 2), a line width "Wi" sensed at this time is stored as an initial value into a register of the microcomputer (step 3). Subsequently, the drive voltage is stepwise increased by 1 step under which a line width "$W_{i+1}$" is sensed (step 4), and then a judgement is made of a step direction based upon a relative relationship between the first-sensed line width "Wi" and the second-sensed line width "$W_{i+1}$". Thereafter, the drive voltage is stepwise produced along this judged stepping direction. If the judgement result would be reversed, then the drive voltage is returned to that for the previous step by 1 step, so that the fine control is completed.

It should be noted that as to the screen voltage control, brightness of the screen is measured by the ITV 600 and then the screen control potentiometer 121b is driven in such a way that the measured brightness of the screen becomes predetermined brightness in a similar manner to that of the above-explained automatic focusing control.

With respect to the arrangement for the automatic focusing voltage (and screen voltage) control system as indicated in FIG. 1, both of the adjustment (control) precision and the reliability of the automatic control apparatus 120 are very important, which are indicated by the function of the motor driven potentiometer.

It should be noted that since the control precision about the focusing voltage and the screen voltage must be selected to be approximately 1% of the output voltage, a stepwise value for 1 step control may be preferably selected to be approximately ¼ (0.25)%. Also, it is preferable that the automatic control apparatus 120 may be molded with the flyback transformer in an integrated form in view of reliabilities of the operations. As a consequence, the drive motor of the automatic control apparatus may preferably satisfy the below-mentioned conditions (1) to (3):

(1). Even in a strong magnetic field, the drive motor of the automatic control apparatus is operable without any trouble.

(2). Low heat dissipation during the normal motor drive operation.

(3). The drive motor owns a stepwise characteristic and has large stationary torque.

To satisfy the above-described conditions, either a plastic geared stepper motor, or an ultrasonic motor is employed as the drive motor in the preferred embodiment of the present invention.

Figure 5:
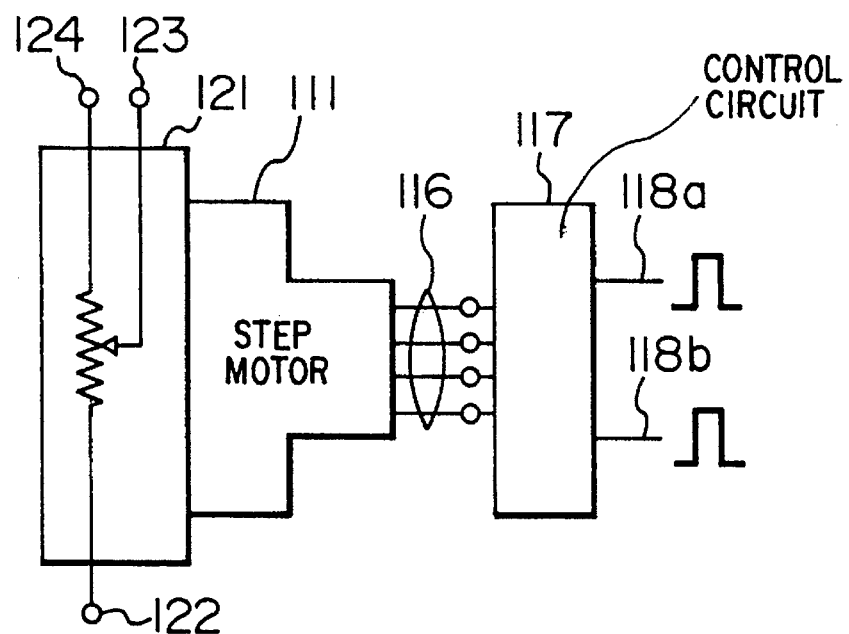
FIG. 5 schematically indicates a construction of an automatic controlling apparatus containing a drive motor and a potentiometer formed in an integrated mode, used in the automatic focusing control according to the present invention.

FIG. 5 schematically illustrates an example of a construction of an automatic control apparatus according to the present invention with employment of a plastic geared stepper motor as the drive motor. In the construction shown in FIG. 5, a high voltage potentiometer 121 is assembled with a stepper motor 111 having a plastic gear in an integrated form. The stepper motor 111 is driven via four drive signal lines 116 (in case of a four-pole stepper motor) by receiving a pulse signal produced from a motor drive control circuit 117 in response to a normal rotation input 118a and a reverse rotation input 118b. In this case, a gear down ratio of this plastic gear is selected to be approximately 0.25% as a voltage variation of the divided output voltage of the potentiometer for one step of the stepper motor, as previously explained.

As a merit of employing such a speed-reduction purpose plastic gear of the drive motor, there are such that no adverse influence is given in the magnetic field and easy lubrication can be achieved. In addition, occurrences of excessive drive torque in an upper limit and a lower limit of the potentiometer can be suppressed since soft plastic such a Teflon (trademark) is used in a portion or a whole portion of the torque transmission, and a structure of the stopper can be made simple.

Figure 6:
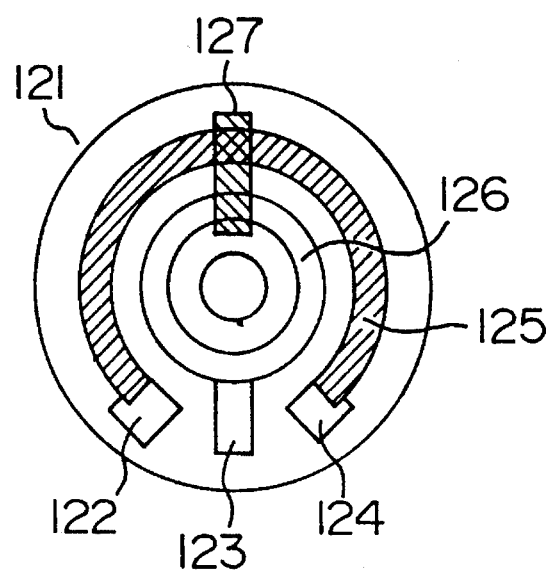
FIG. 6 illustratively shows a structure of the potentiometer used in the automatic focusing control for purposes of explaining the present invention.

FIG. 6 schematically shows a potentiometer employed in the automatic control apparatus, according to one preferred embodiment of the present invention. A resistor member having a thick film 125 is printed on a housing 121 of the potentiometer, and conductive terminals 122, 123 and 124 are provided on both ends of this resistor member 125. A variable ring-shaped print conductive member 126 and a brush 127 form a wiper of the potentiometer. In case of the potentiometer shown in FIG. 6, the brush 127 is made of a cylindrical metal spring coil, a half portion of which is embedded in a disk at the rotary member (not shown). This brush 127 can be firmly in contact with the resistor member 125 and the conductor 126 under a mechanically light load.

Figure 7:
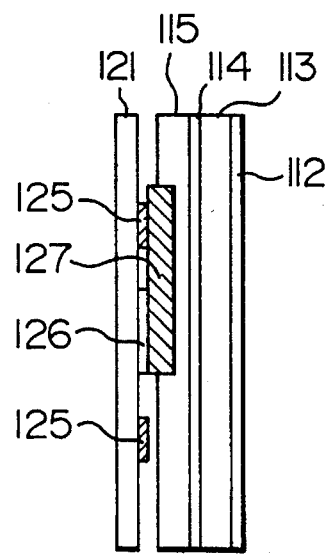
FIG. 7 is a sectional view of another automatic controlling apparatus containing an ultrasonic motor and a potentiometer, according to another preferred embodiment of the present invention.

FIG. 7 schematically indicates a sectional view of another automatic control apparatus, according to another preferred embodiment of the present invention, for containing an ultrasonic motor and a potentiometer in an integrated form. It should be noted that the same reference numerals shown in FIG. 5 are employed as those for denoting the same or similar components indicated in FIG. 6. In FIG. 7, a piezoelectric vibrating element is attached to a metal elastic member 113. Also, a rotary member 115 is in contact with the above-described elastic member 113 via a friction member 114 attached thereto. The rotary member 115 is made of such an electric insulating member as a ceramics plate, in which a notch portion is partially formed. A half portion of the brush 127 made of a cylindrical metal spring coil for this potentiometer is embedded in this notch portion. This brush 127 is in contact with the thick-film resistor member 125 and the conductive member 126 of the potentiometer 121. Although not shown in FIG. 7, there are provided separating electrodes in the piezoelectric vibrating member 112, to which the voltage is applied, such an integrated form of the drive motor unit and the potentiometer unit are entered into a plastic housing (not shown) having a compression spring plate, and maintains a proper contact pressure.

An operation of the automatic control apparatus with the above-described arrangement, shown in FIG. 7, will now be described. Two-phase AC voltages having a predetermined resonance frequency and 90° different phases from each other are applied to the separating electrodes of the piezoelectric vibrating member driving unit 112. As a consequence, a traveling wave is produced in the piezoelectric vibrating member driving unit 112, and then amplified by the elastic member 113. Since the elastic member 113 is in contact with the rotary member 115 via the friction member 114 under exertion of pressure, the rotary member 115 receives a rotation force along a direction opposite to the traveling direction of the traveling wave, and therefore the rotary member 115 is rotated. As a result, the brush 127 of the potentiometer is also rotated so that the voltage applied to the potentiometer 121 can be controlled. Furthermore, the automatic control apparatus of FIG. 7 with employment of the ultrasonic drivemotor has such advantages, in addition to the above-described 3 conditions, as a high response characteristic, high resolution, a simple/compact construction, and a easy molding characteristic.

It should be noted that a control circuit is required to correctly drive a plurality of automatic control apparatuses.

Figure 8:
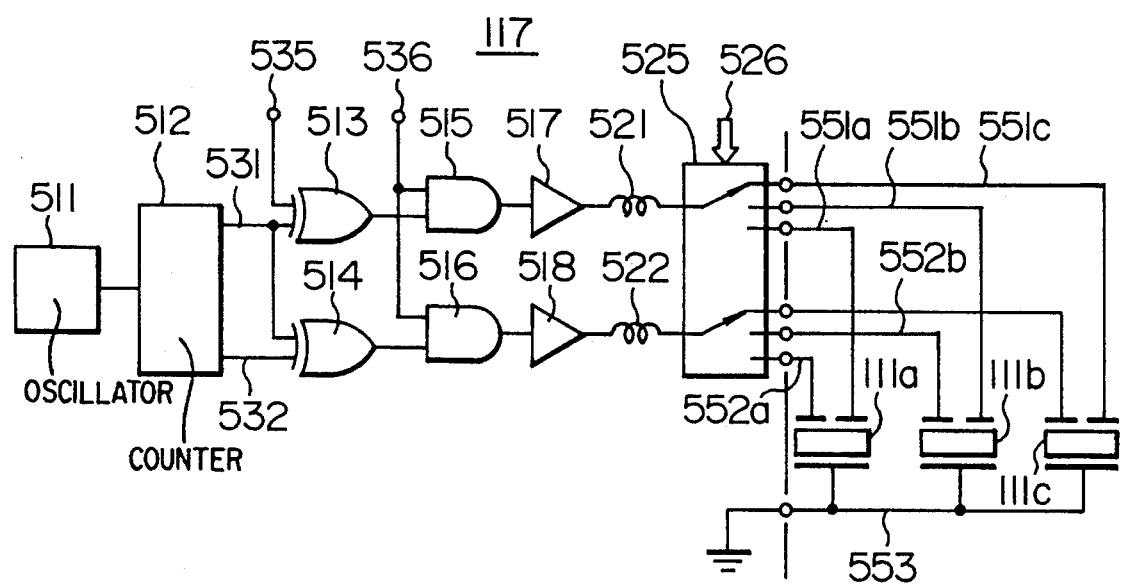
FIG. 8 shows a circuit diagram of a control circuit for controlling the automatic controlling apparatus employing the ultrasonic motor, according to the present invention.

FIG. 8 represents a control circuit for precisely driving three ultrasonic motors. In FIG. 8, a high frequency oscillator 511 of a servo motor control circuit 117 supplies a clock to a counter 512. The counter 512 frequency-divides the inputted clock to obtain frequency-divided outputs having mutually different phases by 90° from two output terminals 531 and 532 thereof. It should be noted that the frequencies of the divided outputs are selected to be commonly the resonance frequency of the ultrasonic motor. Then, two divided output signals are inputted to exclusive OR gate circuits 513 and 514. The exclusive OR gate circuit 513 has a phase inverting input terminal 535. In other words, the waveforms having 90°-phases different from each other derived from the exclusive OR gate circuits 513 and 514 can invert the relationship between "lead" and "delay" in response to the conditions of the input signal of the terminal 535 by applying the input signal having 180° different states of "1" or "0" to the terminal 535. These 2 phase output signals are supplied via AND gate circuits 515 and 516 each having an ON/OFF control terminal 536 to drive amplifiers (driver) 517 and 518, respectively. Outputs of the drive amplifiers 517 and 518 are supplied via filter reactors 521 and 522 and a multiplexer 525 to drive the respective ultrasonic motors 111a to 111c.

The control circuit shown in FIG. 8 with the above-described circuit arrangement can select an arbitrary motor from three ultrasonic motors 111a to 111c in response to the control input 526 of the multiplexer 525 to control the normal rotation or the reverse rotation of the selected ultrasonic motor by the control terminal 535, and also can control the application time of the drive pulse by the control terminal 536.

Figure 9:
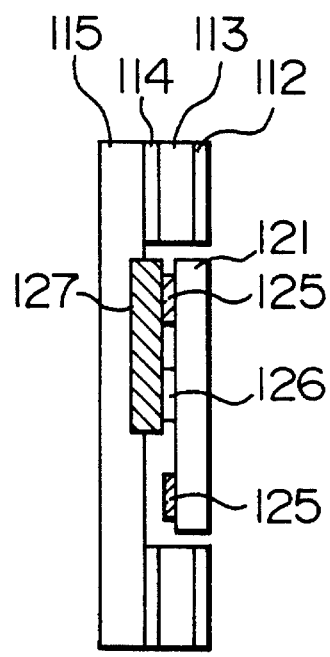
FIG. 9 is a sectional view of another automatic controlling apparatus containing an ultrasonic motor and a potentiometer formed in an integrated mode, according to another preferred embodiment of the present invention.

FIG. 9 is a sectional view of an automatic control apparatus according to a further preferred embodiment of the present invention. In the construction of FIG. 9, drive portions of an ultrasonic motor such as a piezoelectric vibrating member driving unit 112, a metal elastic member 113, and a friction member 114 are arranged at an outer circumference, and a main body 121 of potentiometer is positioned at a center portion of an inside, both of which are constructed by a common rotary member 115. With such a construction, since drive torque is produced at the outer peripheral portion to drive the load at the inner peripheral portion, there is a merit that the overall automatic control apparatus can be made thin and compact.

Figure 10:
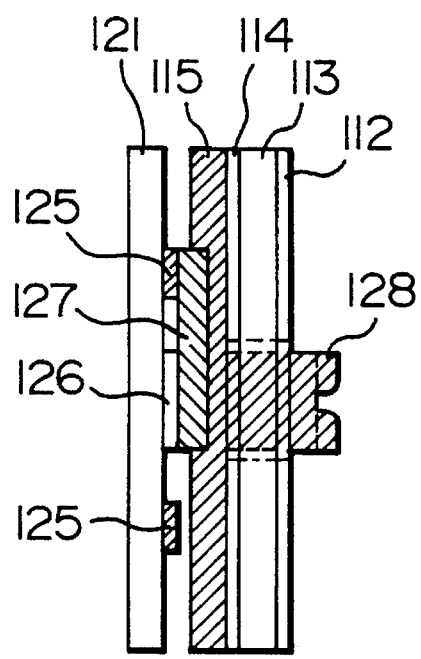
FIG. 10 is a sectional view of an automatic controlling apparatus containing an ultrasonic motor and a potentiometer formed in an integrated form, according to another preferred embodiment of the present invention.

FIG. 10 is a sectional view of an automatic control apparatus according to a further preferred embodiment of the present invention. In the construction of FIG. 10, a drive portion of an ultrasonic motor is identical to that of the preferred embodiment shown in FIG. 7, and there is such a different point that a shaft having a fitting concave for a screw driver is formed on a rotary member 115 of a potentiometer functioning as a load. With such a construction, the screw driver is fitted to the concave of the shaft 128, so that a manual control may be similarly performed.

Figure 11:
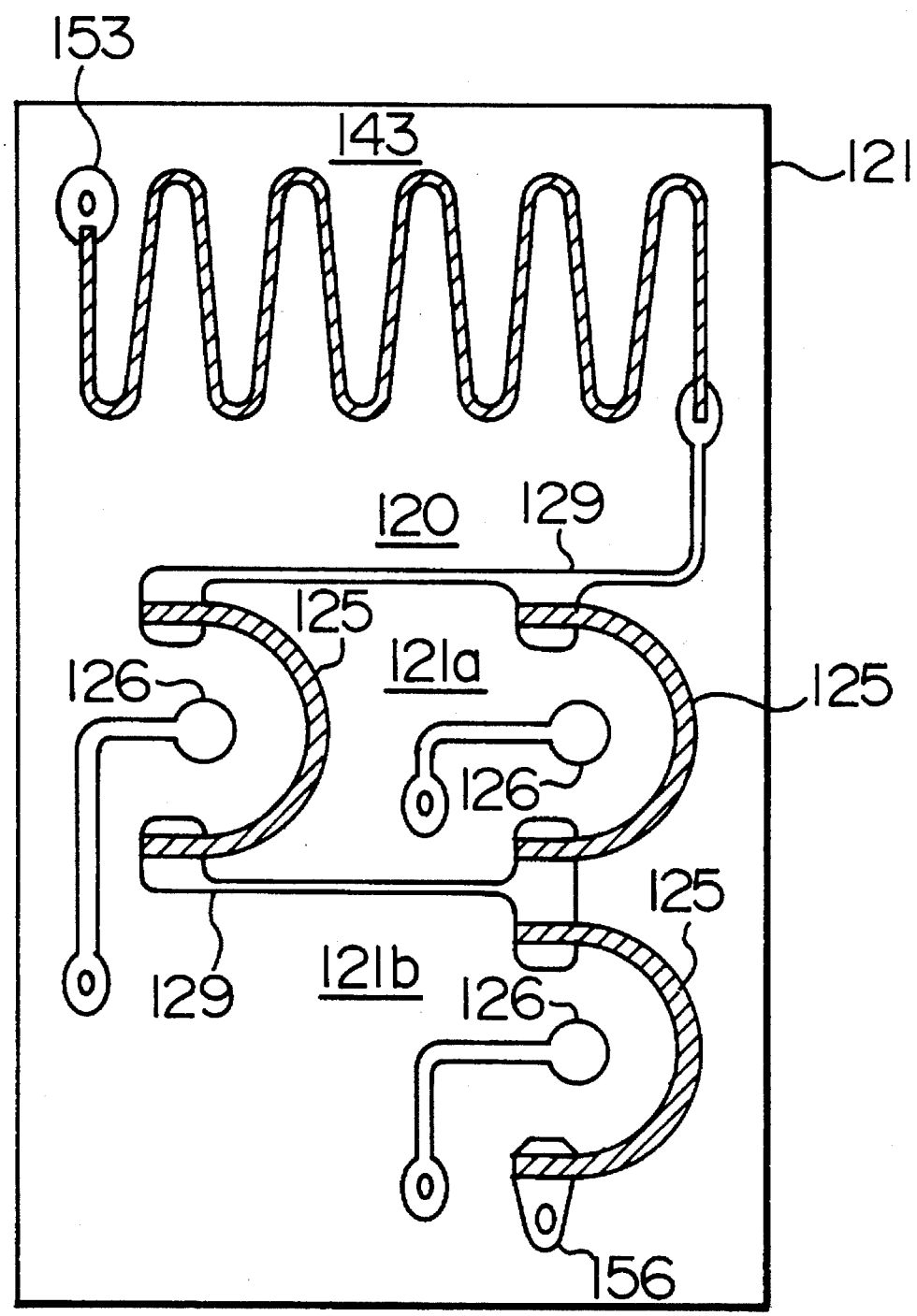
FIG. 11 illustratively represents an automatic controlling apparatus for assembling a plurality of ultrasonic motors and potentiometers on the same circuit board, according to a further preferred embodiment of the present invention.

FIG. 11 represents an example in which the automatic control apparatus according to the present invention is assembled to the same board. In an application to a CRT using a plurality of voltage control circuits as shown in FIG. 1, it is preferable to form the automatic control apparatus as a circuit (assembling member) in which a plurality of elements have been assembled on the same board, in view of reliability about the mutual connections among the high voltage circuit elements, and also economical reasons. As a consequence, in the example of consequence, in the example of FIG. 11, a high-voltage dividing resistor member 143, two focusing control potentiometers 121a and a single screen voltage control potentiometer 121b of an automatic control apparatus 120 are mounted on a circuit board 121, which are mutually connected by a printed conductive member 129. Each of these potentiometers has a thick-film-printed resistor member 125 and a conductive member 126 contacting with a movable brush (not shown in detail). The movable brush of the respective potentiometers is driven by an ultrasonic motor (not shown) similar to that of FIG. 10 which has been employed for each of the potentiometers.

Since the automatic control apparatus according to the present invention has been constructed as illustrated in FIG. 11, reliability and economical matters about mutual connections among these components can be improved.

Although there has been described in the above-explained automatic control apparatuses according to the preferred embodiments of the present invention that the ultrasonic motors and the potentiometers are of rotary type, these components may be alternatively constructed as a straight line motion type.

In accordance with the present invention, since the potentiometers for dividing the high voltage and the motor for driving these potentiometers are mechanically formed in an integrated form in the CRT control apparatus, the CRT display apparatus can be made compact. Also, since a plurality of potentiometers and the motor for driving these potentiometers are formed on the same board in an integrated form, which are then molded with the flyback transformer in an integrated form, the CRT display apparatus can be made compact. Even when such a drive motor as an ultrasonic motor and a plastic geared motor is integrally molded with the flyback transformer, or is operated adjacent to the flyback transformer, this drive motor can be operated even in the strong magnetic field, so that magnetic interference can be minimized and reliability can be improved. Also, since the ultrasonic motor or the plastic geared motor may be driven by intermittently applying a pulse voltage thereto, the potentiometer may be driven in a stepwise mode, so that a fine and precise voltage control is realized.

In accordance with another present invention, the motor formed with the potentiometers in an integrated form is driven based upon the output signal derived from the imaging apparatus arranged at the display screen side of the CRT display apparatus in order that both of the focusing and the brightness of the CRT apparatus become optimum, whereby an automatic focusing/brightness controlling operation can be realized.

We claim:

1. A CRT (cathode-ray tube) display apparatus comprising a control apparatus for controlling a CRT display by changing a grid voltage using a potentiometer, wherein said control apparatus includes a motor for driving said potentiometer in response to an externally supplied control signal, and said motor and potentiometer are mechanically arranged such that said potentiometer and said motor are integrally formed, and wherein said motor is one of an ultrasonic motor and a plastic geared motor:

wherein said control apparatus is molded with a flyback transformer to form the CRT display apparatus in an integrated form.

2. A CRT (cathode-ray tube) display apparatus comprising a control apparatus for controlling a CRT display by changing a grid voltage using at potentiometer, wherein said control apparatus includes a motor for driving said potentiometer in response to an externally supplied control signal, and said motor and potentiometer are mechanically arranged such that said potentiometer and said motor are integrally formed, and wherein said motor is one of an ultrasonic motor and a plastic geared motor:

wherein said control apparatus is molded with a flyback transformer to form the CRT display apparatus in an integrated form.

3. A CRT (cathode-ray tube) display apparatus comprising a control apparatus for controlling a CRT display by changing a grid voltage using a potentiometer wherein said control apparatus includes a motor for driving said potentiometer in response to an externally supplied control signal, and said motor and potentiometer are mechanically arranged such that said potentiometer and said motor are integrally formed, and wherein said motor is an ultrasonic motor.

4. A CRT display apparatus as claimed in claim 3, wherein both of said potentiometer and said motor employed in said control apparatus vary said grid voltage by way of a linear motion.

5. A CRT display apparatus as claimed in claim 3, further comprising an imaging apparatus equipped with a photosensor positioned at a display screen side of said CRT display apparatus, and wherein said motor is driven in response to an output signal derived from said imaging apparatus to automatically control at least one of focusing and brightness of said CRT display apparatus.

6. A CRT display apparatus as claimed in claim 3, wherein said control apparatus controls at least one of focusing and brightness of said CRT display.

7. A CRT display apparatus as claimed in claim 6, wherein a plurality of potentiometers for controlling at least one of the focusing and the brightness of the CRT display, and motors for driving said plural potentiometers are formed on the same board in an integrated form.

8. A CRT display apparatus as claimed in claim 7, wherein resistor members of said potentiometers are printed on said board in a thick film printing manner, and movable members contacting with said resistor members are driven by said motors.

9. A CRT display apparatus as claimed in claim 7, wherein both of said potentiometer and said motor employed in said control apparatus vary said grid voltage by way of a linear motion.

10. A CRT display apparatus as claimed in claim 7, further comprising an imaging apparatus equipped with a photosensor positioned at a display screen side of said CRT display apparatus, and wherein said motor is driven in response to an output signal derived from said imaging apparatus to automatically control at least one of focusing and brightness of said CRT display apparatus.

11. A CRT (cathode-ray tube) display apparatus comprising a control apparatus for controlling a CRT display by changing a grid voltage using a potentiometer, wherein said control apparatus includes a motor for driving said potentiometer in response to an externally supplied control signal, and said motor and potentiometer are mechanically arranged such that said potentiometer and said motor are integrally formed, and wherein said motor is one of an ultrasonic motor and a plastic geared motor:

wherein said motor for driving said potentiometer is a rotary type ultrasonic motor, and further comprising a rotor unit of said ultrasonic motor at an outer peripheral side of said potentiometer.

12. A CRT display apparatus as claimed in claim 11, further comprising a screw driver fitting portion for purposes of manual control formed at a rotary unit of said potentiometer.

* * * * *

UNITED STATES PATENT AND TRADEMARK OFFICE
CERTIFICATE OF CORRECTION

PATENT NO. : 5,459,378
DATED : October 17, 1995
INVENTOR(S) : Kazuo Kato, et. al.

It is certified that error appears in the above-identified patent and that said Letters Patent is hereby corrected as shown below:

Column 1, line 29, change "opened" to --described--.
Column 1, line 37, change "lense" to --lens--.
Column 2, line 22, after "invention" insert --is achieved by--.
Column 4, line 50, change "integral" to --integrated--.
Column 5, line 54, change " 1 " to --one--.
Column 5, line 61, change " 1 " to --one--.
Column 6, line 11, change " 1 " to one--.
Column 6, line 13, delete " may "--.
Column 7, line 41, change " 3 " to --three--.
Column 7, line 63, change " 2 " to --two--.
Column 8, line 43, delete "in the example of consequence,".--.
Column 9, line 34, change " : " to --;--.
Column 9, line 40, change " at " to --a--.
Column 9, line 46, change " : " to --;--.
Column 9, line 52, after "potentiometer" insert --, --.

UNITED STATES PATENT AND TRADEMARK OFFICE
CERTIFICATE OF CORRECTION

PATENT NO. : 5,459,378
DATED : October 17, 1995
INVENTOR(S) : Kazuo Kato, et al

It is certified that error appears in the above-indentified patent and that said Letters Patent is hereby corrected as shown below:

Column 10, line 45, change ":" to —;—

Signed and Sealed this

Twenty-sixth Day of March, 1996

Attest:

BRUCE LEHMAN

Attesting Officer     Commissioner of Patents and Trademarks